United States Patent [19]

Yip et al.

[11] Patent Number: 5,764,664
[45] Date of Patent: Jun. 9, 1998

[54] DIRECT MODULATION METHOD FOR LASER DIODE IN A LASER FILM PRINTER

[75] Inventors: Kwok Leung Yip, Webster; Richard Frank Kerr, Churchville; Sreeram Dhurjaty, Rochester, all of N.Y.

[73] Assignee: Eastman Kodak Company, Rochester, N.Y.

[21] Appl. No.: 650,009

[22] Filed: May 17, 1996

[51] Int. Cl.$^6$ ........................................ H01J 3/10
[52] U.S. Cl. ........................................ 372/26; 372/38
[58] Field of Search ........................................ 372/26, 38

[56] References Cited

U.S. PATENT DOCUMENTS

| | | | |
|---|---|---|---|
| 4,774,710 | 9/1988 | Davis et al. | 372/9 |
| 4,799,069 | 1/1989 | Sasaki et al. | 346/108 |
| 5,081,631 | 1/1992 | Dhurjaty | 372/38 |
| 5,196,867 | 3/1993 | Woo et al. | 346/108 |
| 5,270,736 | 12/1993 | Inoue et al. | 346/108 |
| 5,283,793 | 2/1994 | Shoji | 372/24 |
| 5,325,383 | 6/1994 | Davis et al. | 372/26 |
| 5,436,921 | 7/1995 | Corio | 372/26 |
| 5,515,192 | 5/1996 | Watanabe | 372/26 |
| 5,521,738 | 5/1996 | Froberg et al. | 372/38 |

*Primary Examiner*—Rodney B. Bovernick
*Assistant Examiner*—Robert E. Wise
*Attorney, Agent, or Firm*—William F. Noval

[57] ABSTRACT

A laser imaging apparatus comprising:
 a laser diode which is always operable in a linear lasing region;
 an amplitude modulator for amplitude modulating said laser diode for a digital image signal applied to said laser diode, when said digital image signal has a code value in a first range of code values in the mid to high range of signal code values; and
 a high speed pulse width modulator for pulse width modulating said laser diode when said digital signal, which is applied to said laser diode, has a code value in a second range of code values below said first range of code values, said laser diode being operated at a constant predetermined power level which is above the threshold power level of said laser diode.

4 Claims, 10 Drawing Sheets

DIRECT MODULATION METHOD FOR LASER DIODE IN A LASER FILM PRINTER

FIELD OF THE INVENTION

This invention relates in general to laser imaging apparatus, such as laser film printers. More particularly, the present invention relates to a direct modulation method for a laser diode used in a laser imaging apparatus.

BACKGROUND OF THE INVENTION

In a first-generation known laser printer, the output power of a HeNe gas laser is modulated by an acousto-optic modulator (AOM) according to the input image data to produce a continuous-tone image on film. The rapid development in recent years of high quality and high reliability solid-state laser diodes has led to many diverse applications of these devices including communications, optical recording, and laser printers. The laser diode has the advantages of small size, low power dissipation, ease of modulation, low noise, low cost, various wavelengths, and tunability. Consequently, the second-generation known laser printers use a laser diode as the light source for imaging. While the laser diode in this printer is driven by a constant current, an AOM is still used to modulate the laser power. Since a laser diode can be modulated at frequencies as high as several hundred megahertz by changing the drive current, it is logical and cost effective to replace the AOM with direct laser modulation. However, there are several major problems in implementing direct laser modulation in a radiographic laser printer, including small dynamic range of laser diode, delicate current control and temperature control for the device.

Figure 1:
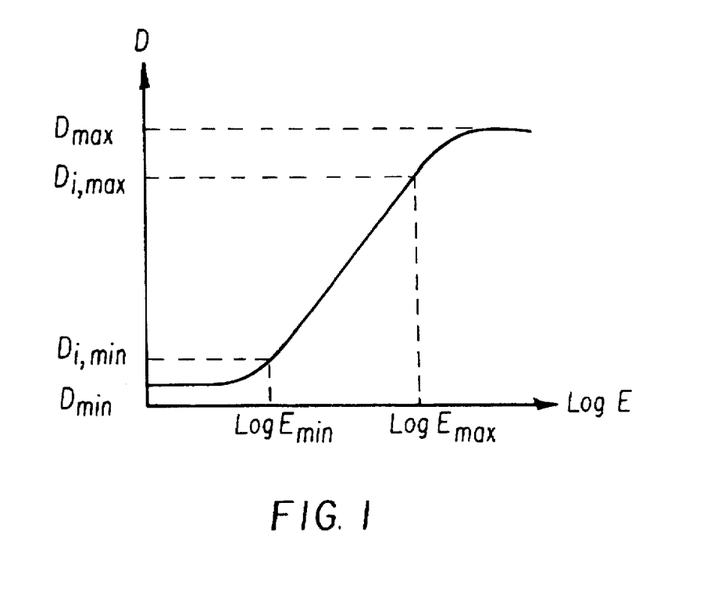
FIG. 1 is a typical characteristic curve of film.

In a laser-film printing system, the required dynamic range of exposure is determined by the characteristic curve of the film at the wavelength of the writing laser beam and the desired maximum and minimum density on the printed image as shown in FIG. 1. Here, $D_{i,max}$ is the desired maximum image density for the maximum input code value $CV_{max}$ and $D_{i,min}$ is the minimum image density for the minimum code value $CV_{min}$. It should be noted that $D_{i,max}$ and $D_{i,min}$ may be different from the maximum and minimum density of the film ($D_{max}$ and $D_{min}$), respectively, but they are in the range between $D_{min}$ and $D_{max}$. From FIG. 1, the corresponding maximum and minimum exposure are $E_{max}$ and $E_{min}$, respectively. The required dynamic range of laser exposure is simply the ratio of $E_{max}$ and $E_{min}$.

Figure 2:
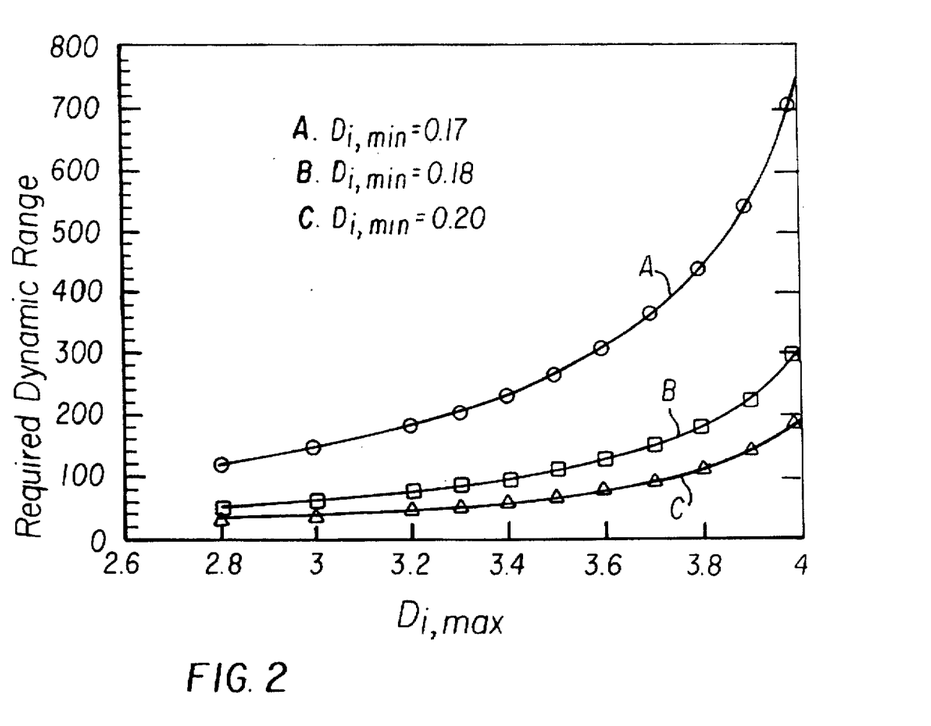
FIG. 2 is a graphical view showing the dependence of required dynamic range of exposure on desired maximum and minimum image density.

As an example, the required dynamic range of exposure for the latter printer is calculated as a function of maximum and minimum image density and is shown in FIG. 2. With $D_{i,max}=3.4$ and $D_{i,min}=0.17$, the required dynamic range of exposure is 235.

Figure 3:
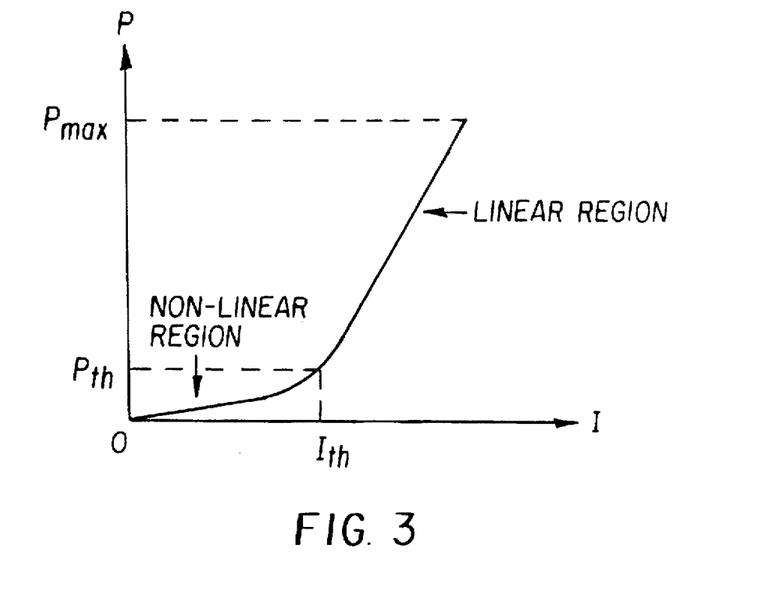
FIG. 3 is a typical light-current characteristic of a laser diode.

Laser diodes are threshold devices. They emit laser light above a certain forward current level (called the threshold current $I_{th}$), below which they emit incoherent light. The light-current characteristics of a typical laser diode is shown in FIG. 3. The operating curve can be divided into two regions: the linear region above the threshold (called the lasing or stimulated emission region) and the non-linear region below the threshold (called the light emitting or spontaneous emission region). In the non-linear region, the laser diode has lower efficiency, broader spectral width, and larger beam divergence than in the linear region. Since the non-linear region is unsatisfactory for printing a continuous tone image in response to digital image data, the dynamic range of a laser diode is usually defined by the ratio of maximum power ($P_{max}$) and minimum power ($P_{th}$) in the linear region. For example, a commercially available laser diode (with $P_{max}=20$ mW and Pth=1 mW) has a dynamic range of 20. It is clear that if the simple modulation of laser power is used, the dynamic range of exposure is not wide enough to print the desired density range on film.

Figure 4A:
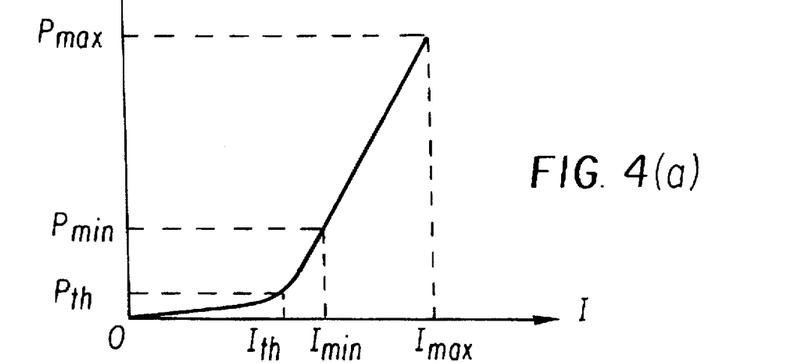
FIGS. 4(a)–4(c) are graphical depictions illustrating the triangular modulation method for laser diodes.
Figure 4B:
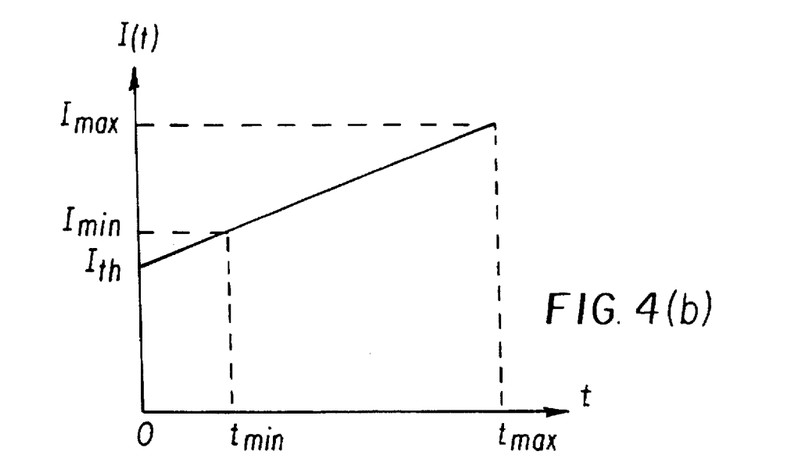
Figure 4C:
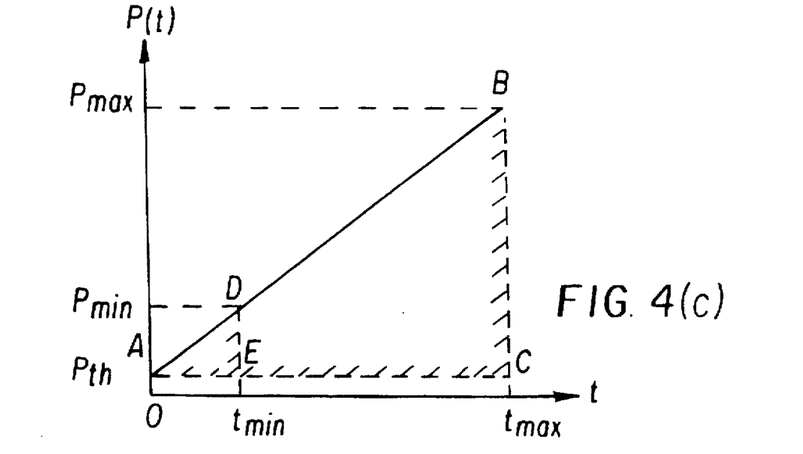

To extend the dynamic range of laser diode for radiographic printing, there have been several direct modulation techniques proposed in the patent literature. These techniques are as follows:

1. A triangular modulation method was developed by Inoue (U.S. Pat. No. 5,270,736, issued Dec. 14, 1993) for a commercially available laser diode printer, as schematically shown in FIG. 4. In this method, the light power from a laser diode [with light-current characteristics shown in FIG. 4(a)] is increased with a lapse of time, and the laser is driven until a light intensity corresponding to a desired exposure amount is obtained [FIG. 4(b)]. Consequently, a triangular output waveform results [FIG. 4(c)]. Here, drive time $t_{min}$ and $t_{max}$ correspond to the minimum and maximum input code value, respectively. The dynamic range of exposure is thus given by the ratio of the area of $\triangle ABC$ and the area of $\triangle ADE$ [FIG. 4(c)]. Although the dynamic range for this printer is about 70, improved dynamic range would be desirable.

2. Woo and Yip, U.S. Pat. No. 5,196,867, issued Mar. 23, 1993, described a method to extended the dynamic range of a continuous tone laser printer by directly modulating a laser diode while simultaneously modulating the optical output of the laser diode with an acousto-optic modulator (AOM). Depending on the image value, the power of the laser diode is set at one of two levels in the linear region of the laser's operating curve while the diffraction efficiency of the AOM is varied according to one of the two linearized operating curves for the modulator. The resulting power of the writing laser beam at the film plane is a linear function of the input image value. Assuming that the ratio of the two laser power levels produced by direct modulation of laser diode is 5 and that the dynamic range of AOM is 300, the total dynamic range of the laser power (which exposes the film) becomes 1,500. This extended dynamic range is much larger than the dynamic range of either the laser diode or the AOM taken alone. However, an AOM is still needed in this method.

3. Davis and Hardy, U.S. Pat. No. 4,774,710, issued Sep. 27, 1988, described a method for controlling a laser diode to generate an exposure level at the film plane as a function of the input image value. In this method, the laser diode is amplitude modulated in the linear region of the diode if the image values are above a switch over point. The switch over point is selected to be above the threshold of the diode's operating curve. If the image values are below the switch over point, then the diode is switched several times between an "on" state whose power is above the threshold and an "off" state to form one pixel. The diode on-time during the formation of one pixel depends on the image value.

4. Dhurjaty, U.S. Pat. No. 5,081,631, issued Jan. 14, 1992, described the direct modulation of a laser diode in which the laser is amplitude modulated in the linear lasing region for high image values and is pulse-width modulated for low image values. A programmable digital delay produces the pulse width modulating signal and a digital comparator determines whether the laser diode operates in the amplitude modulation mode or the pulse width modulation mode. The dynamic range of exposure for the combined amplitude/pulse width modulation would be the product of dynamic ranges for the amplitude modulation and the pulse width modulation.

5. Davis and Hardy, U.S. Pat. No. 5,325,383, issued Jun. 28, 1994, further described a hybrid laser modulation scheme which utilizes various combinations of amplitude, pulse width, pulse amplitude, and pulse number modulation to optimize the exposure characteristics of a laser diode and to obtain the maximum dynamic range of exposure without the use of the non-linear light emitting region of the laser diode.

6. Shoji, U.S. Pat. No. 5,283,793, issued Feb. 1, 1994, disclosed a laser operation control circuit which produces drive current according to image signal for the laser diode over the linear and non-linear regions. A device superimposes a radio-frequency current upon the drive current for the laser diode only in the linear region to eliminate the mode hopping effect of the laser diode.

7. Sasaki and Misawa, U.S. Pat. No. 4,799,069, issued Jan. 17, 1989, disclosed the combined use of pulse amplitude modulation and pulse width modulation to adjust the image density on film. This would also eliminate mode hopping noise and optical feedback induced intensity noise.

In general, although the triangulation method as been implemented in a commercial laser diode printer, the other direct modulation techniques described above would require more than a trivial implementation.

SUMMARY OF THE INVENTION

According to the present invention, there is provided a solution to the problems described above.

According to a feature of the present invention, there is provided a laser imaging apparatus comprising:

a laser diode which is always operable in a linear lasing region;

an amplitude modulator for amplitude modulating said laser diode for a digital image signal applied to said laser diode, when said digital image signal has a code value in a first range of code values in the mid to high range of signal code values; and a high speed pulse width modulator for pulse width modulating said laser diode when said digital signal, which is applied to said laser diode, has a code value in a second range of code values below said first range of code values, said laser diode being operated at a constant predetermined power level which is above the threshold power level of said laser diode.

DESCRIPTION OF THE INVENTION

Figure 5:
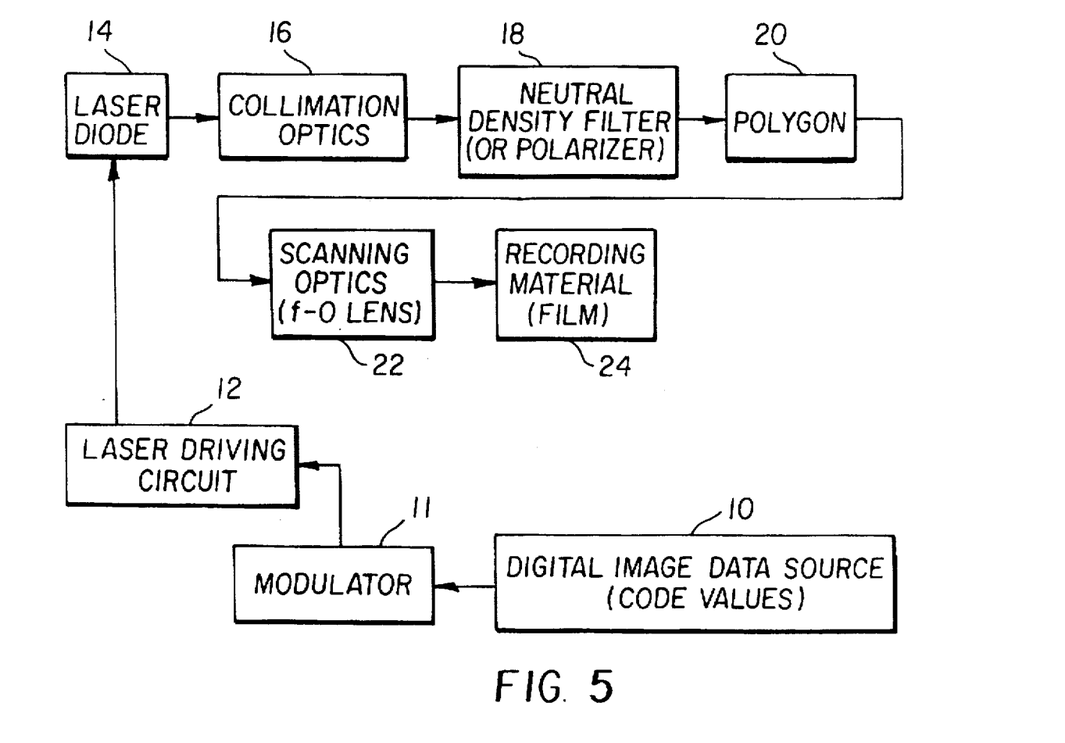
FIG. 5 is a functional block diagram of a laser printer.

FIG. 5 is a functional block diagram of a laser printer, in which the laser diode is directly modulated without an acousto-optic modulator. In the proposed hybrid amplitude/pulse width modulation scheme, the laser diode is amplitude modulated for the mid-to-high density region and is pulse-width modulated for the low density region. As shown, a digital image data source 10 provides a digital image having a range of code values dependent on the bit depth of each pixel. For example, for a 12-bit digital image, the range of code values is from 0 to 4095. Data source 10 may be the source of a digital medical image, such as a digital radiographic image. The digital signal is applied to laser diode 14 by laser driving circuit 12 after modulation by modulator 11 (to be described in greater detail later). Laser diode 14 produces a modulated laser beam which is collimated by collimation optics 16, is passed through neutral density filter or polarizer 18. The laser beam is scanned in a line direction by polygon scanner 20 onto recording material (film) 24 after passing through scanning optics (F-theta lens) 22.

Figure 6:
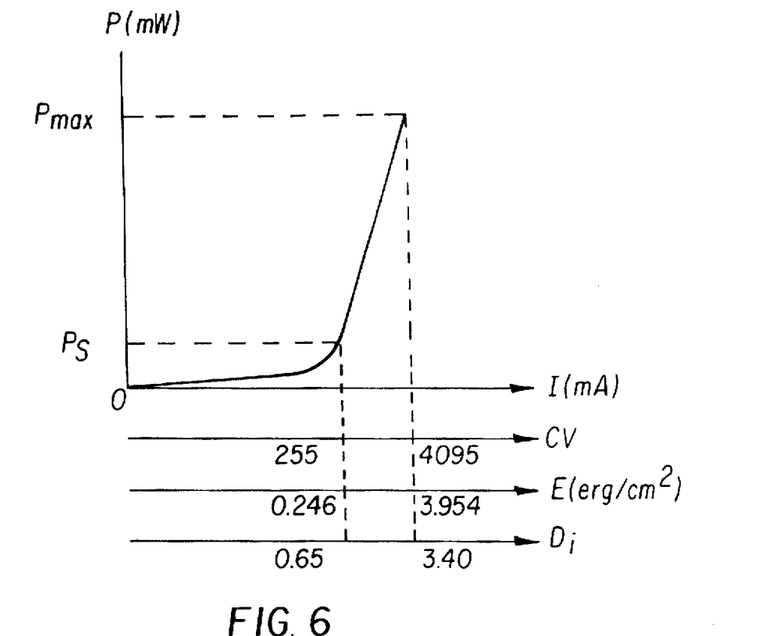
FIG. 6 is a graphical view showing amplitude modulation of a laser diode for code values between 255 and 4095 for a 12-bit digital image signal.

FIG. 6 illustrates the use of simple amplitude modulation of laser diode in a 12-bit radiographic laser printer for a code value from 255 to 4095 inclusive. For these code values, the laser power is modulated within the linear region of the operating curve of the diode with constant pulse width (which is equal to the pixel time, 288 nsec). The drive current (I) and thus the laser power (P) are directly proportional to the input code value (CV), $$P(CV) = P_S + \frac{(P_{max} - P_S)}{(4095 - 255)} \cdot (CV - 255)$$

where $P_{max}$ is the maximum laser power at CV=4095 and $P_S$ is the starting laser power for amplitude modulation. Typical values for $P_{max}$ and $P_S$ are 20 mW and 1.25 mW, respectively, yielding a dynamic range of 16.

Figure 7:
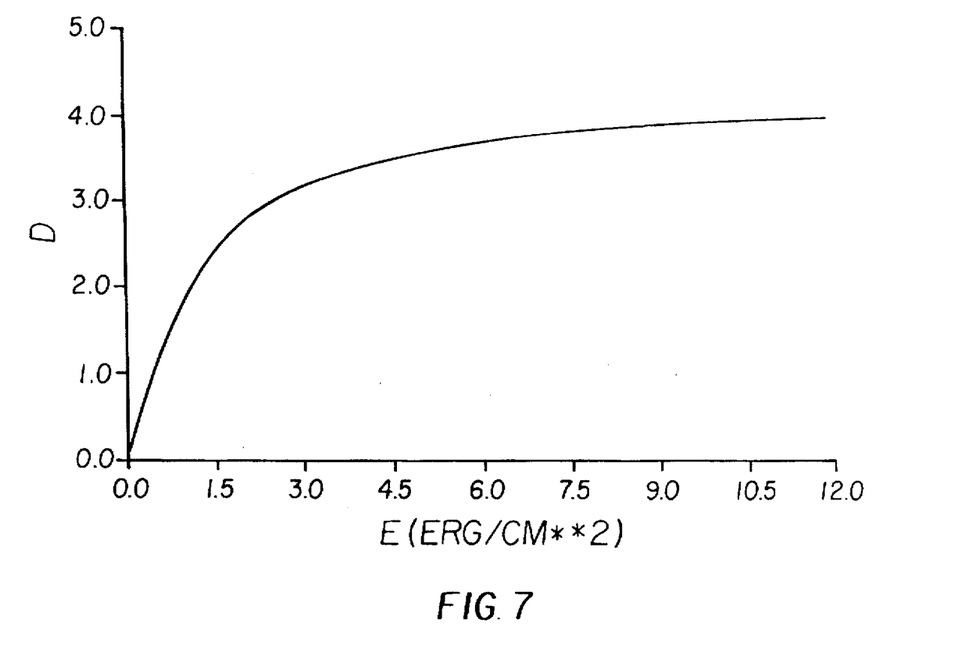
FIG. 7 is a characteristic curve of a commercially available radiographic laser film.

With a proper neutral-density filter or a polarizer, the exposure at the film plane is adjusted so that the output image densities are 3.40 and 0.65 corresponding to the code values of 4095 and 255, respectively. Here, we have used the characteristic curve of a commercially available radiographic film (FIG. 7) to transform laser exposure into image density.

For a code value in the range of 255 to 4095 inclusive for an exemplary 12-bit digital image, the maximum density difference $(\Delta D)_{max}$ between two consecutive gray levels is 0.0028, and the corresponding maximum luminance contrast $(\Delta L/L)_{max}$ is 0.0063. Since the maximum luminance contrast is less than the visual threshold contrast of 0.012, there will be no visible contouring artifacts. Also, the calculated maximum line contrast in the fast-scan and slow-scan direction are 0.00 and 0.04, respectively. These contrast values are less than the visual threshold contrast of 0.115 at the line frequency of 40 c/deg. Therefore, there will be no visible horizontal and vertical line artifacts.

For code values between 0 and 255, according to a feature of the present invention, the laser diode is pulse-width modulated using a high speed pulse width modulator (such as Model AD9560, Analog Devices). Such a high-speed pulse-width modulator, preferably has the following features:

The output pulse width is proportional to an 8-bit input code value except for the first few and last few code values. (See FIG. 8.)

Pulses can be placed at the beginning, middle, or end of the pulse clock period with two additional control inputs.

The pulse width as well as the pulse position can be changed every clock cycle (pixel) up to 50 MHz.

Figure 8:
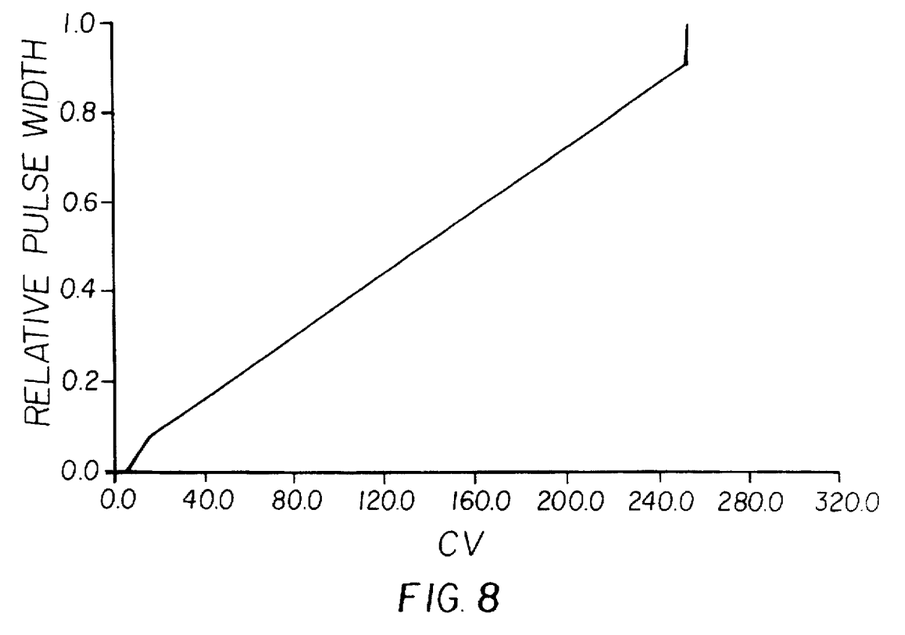
FIG. 8 is a graphical view of the transfer function of a pulse width modulator.

When the laser diode is operated in the pulse-width modulation mode, the laser power is set at $P_S$ above the threshold power (e.g., 1.25 mW), the clock frequency is set at a preselected value (e.g., 3.47 MHz, yielding an exemplary clock period of 288 nsec), and the pulse width is varied with input code value [w=w(CV)] according to the transfer function shown in FIG. 8. Assuming that due to the finite rise and fall time on the pulse, the minimum pulse width is 15 nsec, the dynamic range for pulse width modulation is 19.2. The total dynamic range for the combined amplitude/pulse width modulation thus becomes 307.

Figure 9:
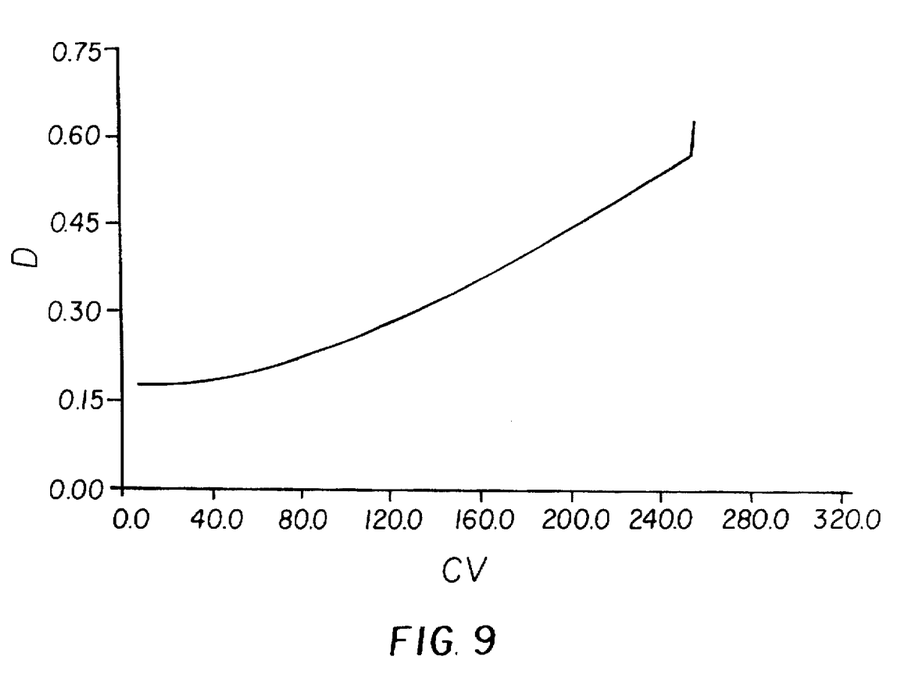
FIG. 9 is a graphical view of image density vs. code value, calculated by using pulse width modulation.
Figure 10:
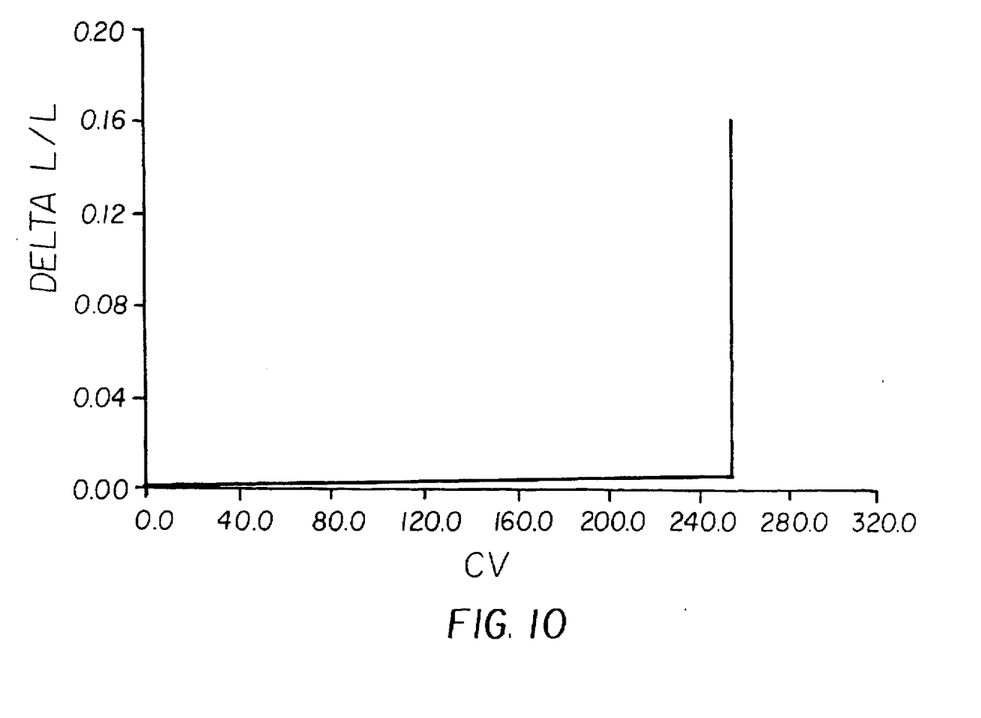
FIG. 10 is a graphical view of luminance contrast vs. code value, calculated by using pulse width modulation.

From an image analysis, the image density and luminance contrast between two consecutive gray levels are calculated as a function of code value and shown in FIGS. 9 and 10, respectively. It is noted that there is a big jump in image density when CV is increased from 254 to 255. This is a direct result of the discontinuity at CV=254 in the transfer function of the pulse width modulator (FIG. 8).

As the luminance contrast between code values 254 and 255 is greater than the threshold contrast, there will be visible contours between these two gray levels. In addition, the calculated maximum value of the line contrast in the fast-scan direction is 10×the value in the slow-scan direction (0.022). Therefore, we would observe only vertical line structures but no horizontal line patterns.

In order to compensate for the non-ideal transfer function of the pulse-width modulator, the laser power is varied as a function of code value according to the following equation $$P(CV) = \frac{P_S \cdot \frac{1}{255} \cdot CV}{w(CV)}.$$

Figure 11:
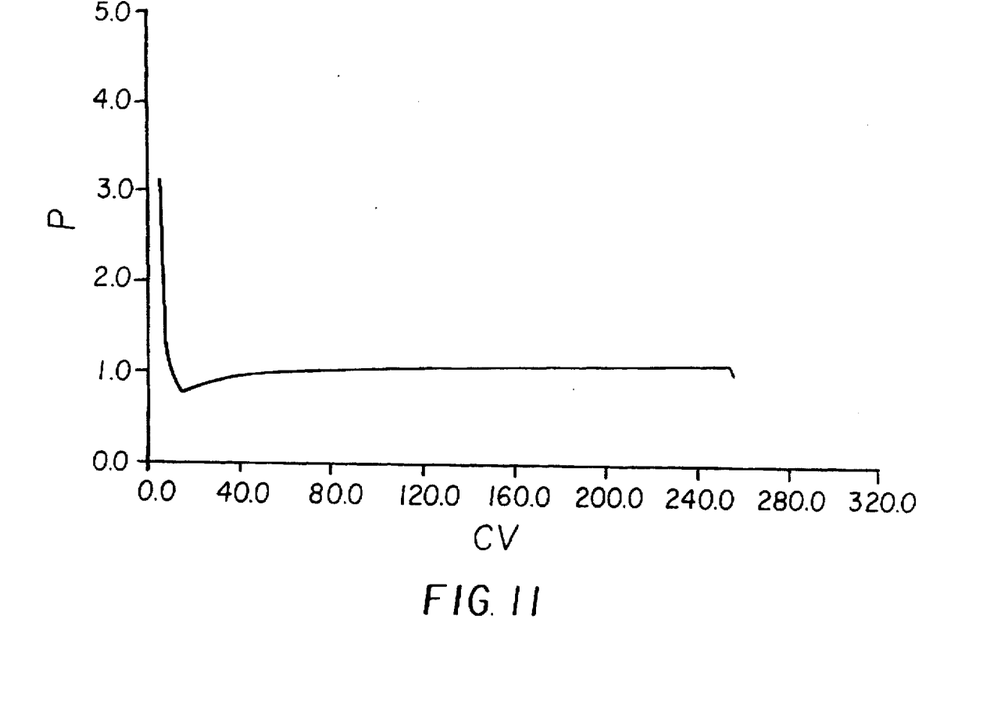
FIG. 11 is a graphical view of adjusted laser power vs. code value for compensating the non-ideal transfer function of pulse width modulator.
Figure 12:
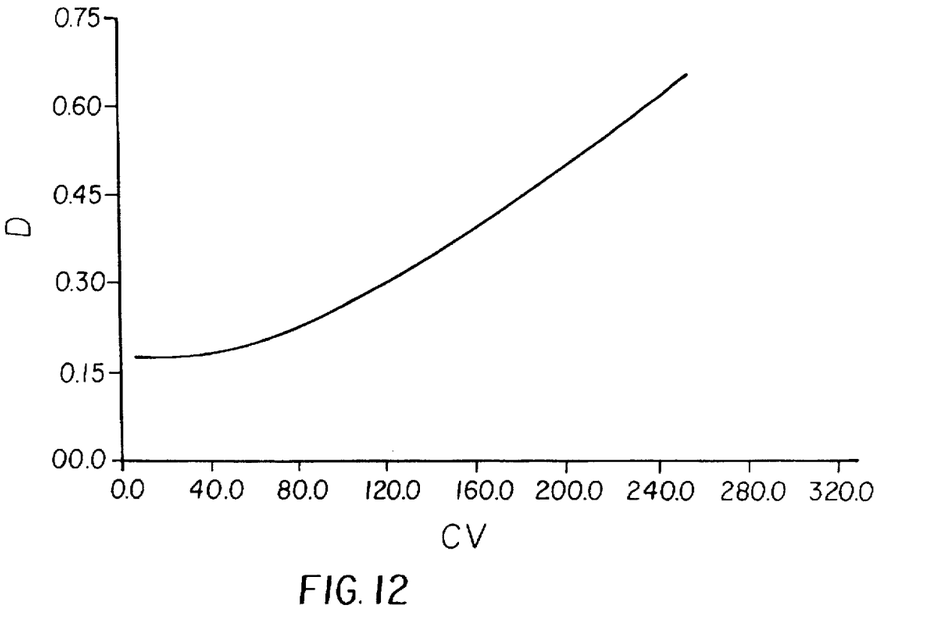
FIG. 12 is a graphical view of image density vs. code value, calculated by using pulse width modulation with adjusted laser power.
Figure 13:
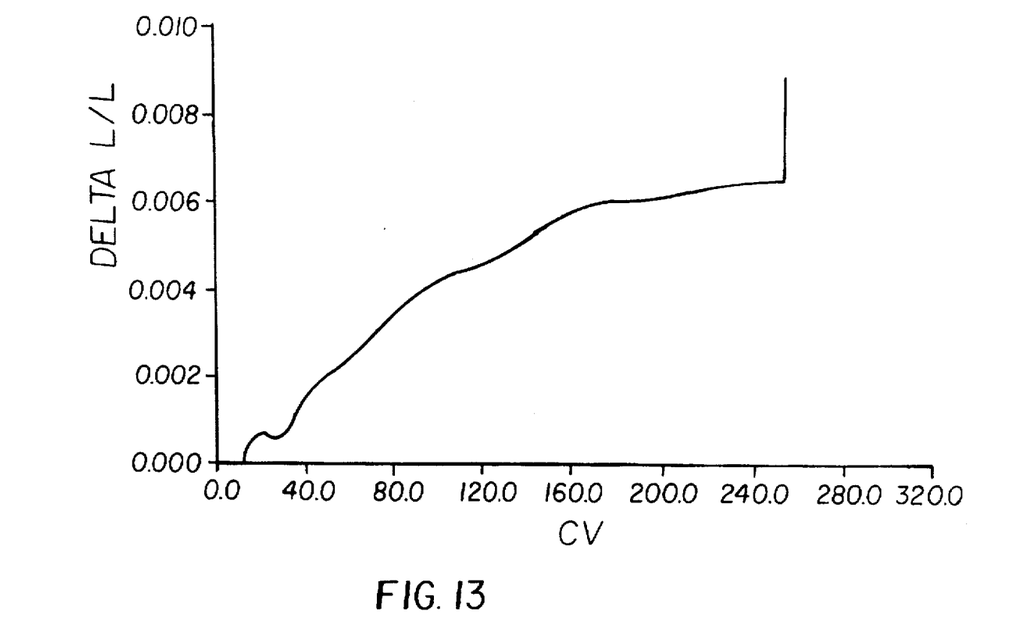
FIG. 13 is a graphical view of luminance vs. code value, calculated by using pulse width modulation with adjusted laser power.

FIG. 11 shows the dependence of laser power on code value for CV from 0 to 254 inclusive. The resulting image density and luminance contrast between two consecutive gray levels are shown in FIGS. 12 and 13, respectively. Since luminance contrast is less than threshold contrast, there will be no visible contouring artifacts.

In addition, the calculated maximum values of line contrast are 0.282 and 0.024 in the fast-scan and slow-scan direction, respectively. These results indicate that while there will be no visible horizontal line patterns, the vertical line structures resulted from pulse width modulation are still visible. To suppress the visibility of these vertical lines, we may program the pulse width modulator to place the pulse randomly from pixel to pixel. Alternatively, we may change the pulse rate (clock frequency) of the pulse width modulator, from 3.47 MHz to 6.94 MHz, such that each pixel consists of two pulses instead of one pulse. As a result, the line frequency in the fast-scan direction is increased from 40 c/deg to 80 c/deg and the threshold contrast at 80 c/deg is greater than 1.0. Therefore, vertical line artifacts will not be visible. As an example, the circuitry described below with respect to FIG. 14, generates three pulses for each pixel to modulate the power of the laser diode.

The modulation transfer function (MTF) of an imaging system is an important image quality metric used to evaluate the resulting image sharpness or acutance. The MTF of a laser-film printing system is primarily determined by the laser beam size and the pixel size. Since the same beam size and pixel size will be used in the combined amplitude and pulse-width modulation technique according to the present invention, there will be no observable change in MTF and thus in image sharpness.

Figure 14:
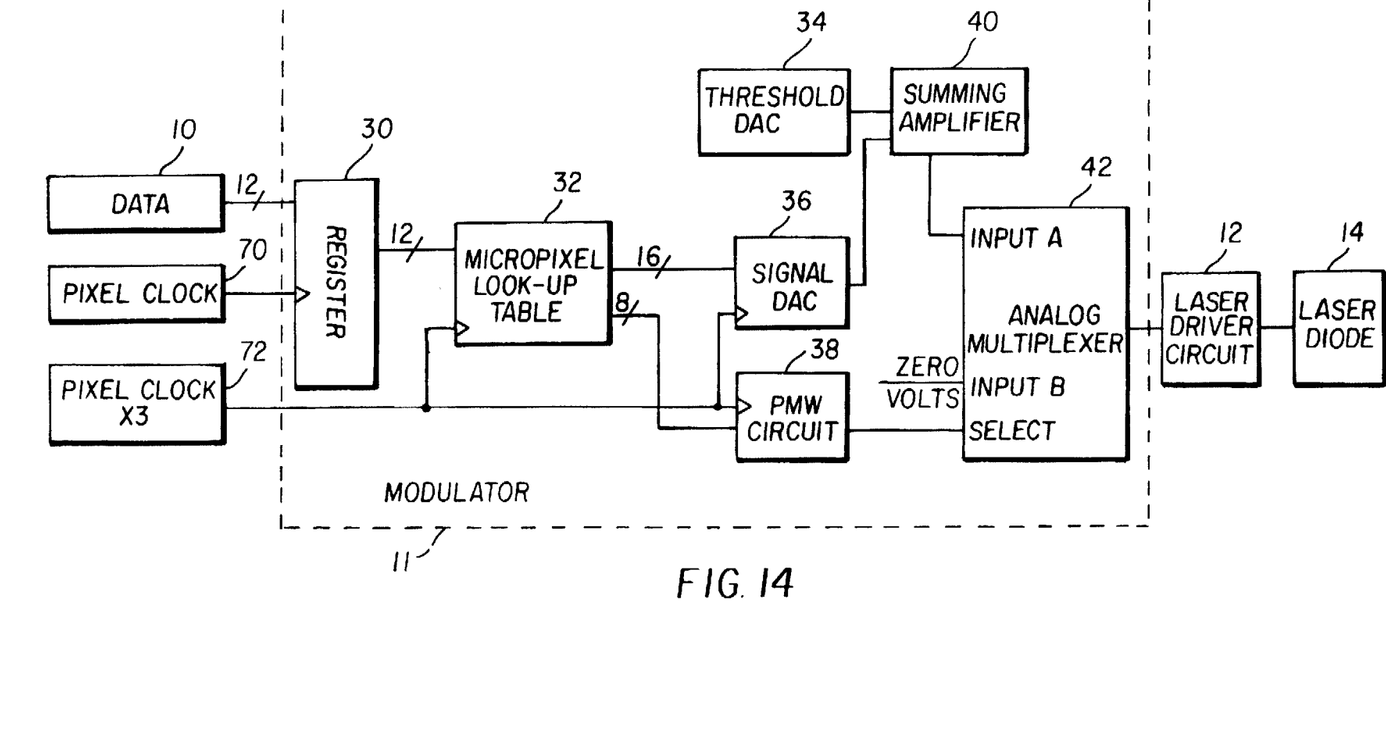
FIG. 14 is a block diagram of laser imaging apparatus incorporating an embodiment of the present invention.

Referring now to FIG. 14, there is shown a circuit incorporating the present invention. As shown, the data from data source 10 is applied to modulator 11 according to the present invention. Modulator 11 also receives clock signals from pixel clock 70 and 3×pixel clock 72. The modulator creates multiple new micropixels from one input pixel, in this example, three new micropixels from one input pixel. Pipeline register 30 is used to store the 12-bit input pixel value from data source 10. Micropixel lookup table 32 generates three unique micropixel values. Pipeline register 30 is loaded with pixel clock 70 of period 288 nsec. Lookup table 32, signal DAC 36, and PWM circuit 38 are sequenced by pixel clock 3×72 of period 96 nsec.

A micropixel consists of 16 bits of pulse-amplitude control and 8 bits of pulse-width control. The 16-bit pulse amplitude signal is presented to 16-bit Digital-to-Converter (DAC) 36. The output of DAC 36 is combined with the output of threshold DAC 34 in summing amplifier 40. The threshold DAC 34 is used to bias the laser diode above its threshold current. This combination allows the laser diode threshold range to be adjustable and the entire range of the signal amplitude DAC 36 to function above the threshold.

The pulse-width control circuit 38 receives an 8-bit signal from micropixel lookup table 32 and produces an active high pulse whose width is proportional to the magnitude of the digital input for a fixed clock period. The output of PWM circuit 38 is used to select between one of two inputs of an analog multiplexer 42. When the pulse-width signal is high, multiplexer 42 selects the combined amplitude signal from summing amplifier 40 on input A. When the pulse-width signal is low, multiplexer 42 selects zero volts on input B. The output of the analog multiplexer 42 represents a signal which incorporates both pulse-amplitude and pulse-width modulation. The analog multiplexer 42 output is applied to laser driver circuit 12 to control the output of laser diode 14.

According to another feature of the present invention, the effect of reciprocity failure in the image is compensated for. The reciprocity law for photographic film states that the optical density of the film is determined by the integrated exposure and is independent of the rate at which the exposure is made. In simple terms, exposure is the product of light intensity (I) and exposure time (t).

$$E = I \cdot t$$

Thus, if I is increased by 2×to 2I, and t is decreased by 2×to t/2, the output film density would be the same since the exposure is still the same. X-ray film exposed directly to x-rays obeys the reciprocity law.

Figure 17:
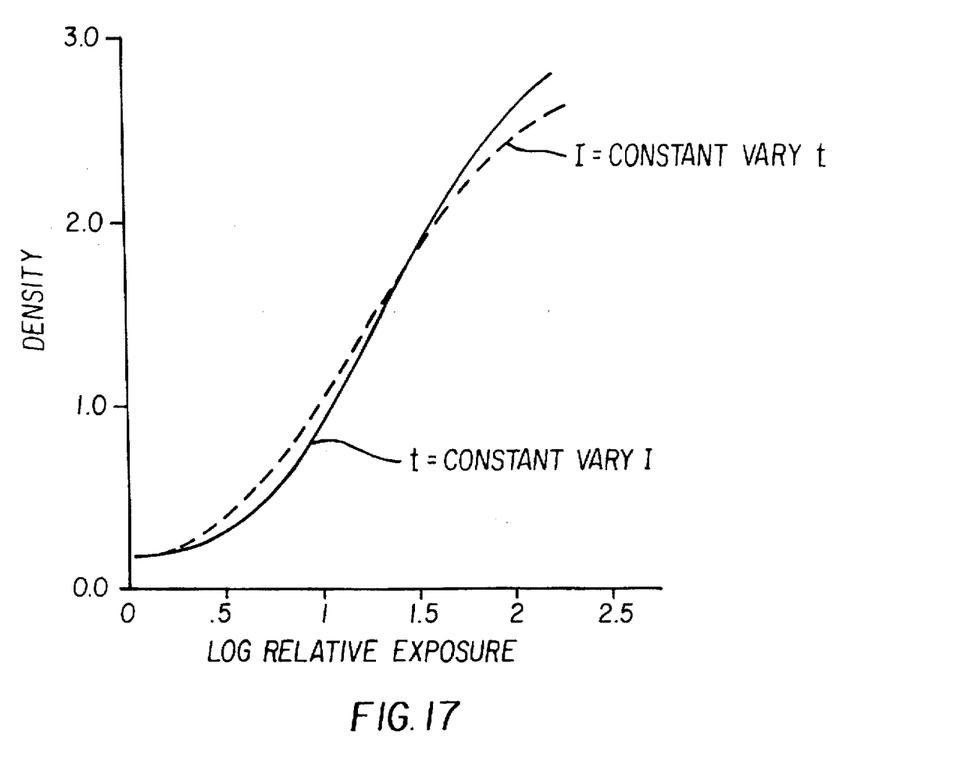
FIG. 17 is a graphical view of the reciprocity law failure effect of a radiographic laser film.

On the other hand, the reciprocity law does not hold for x-ray film exposed to light, either with x-ray intensifying screens or with laser light. A typical example for reciprocity law failure is shown in FIG. 17.

It is therefore necessary to compensate this effect with a digital lookup table generated by a calibration step involving the printing of a gray scale pattern and measurement of the density of these gray scale tablets with a densitometer.

Figure 15:
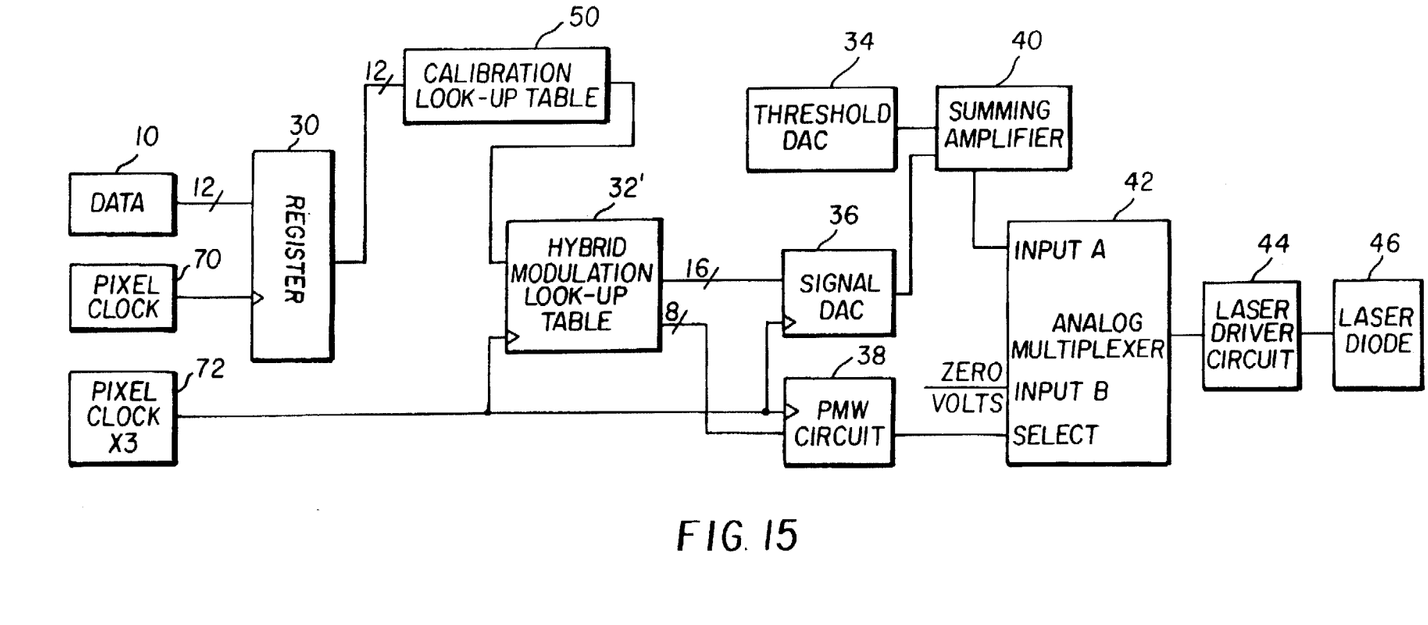
FIG. 15 is a block diagram of laser imaging apparatus incorporating another feature of the present invention.
Figure 16:
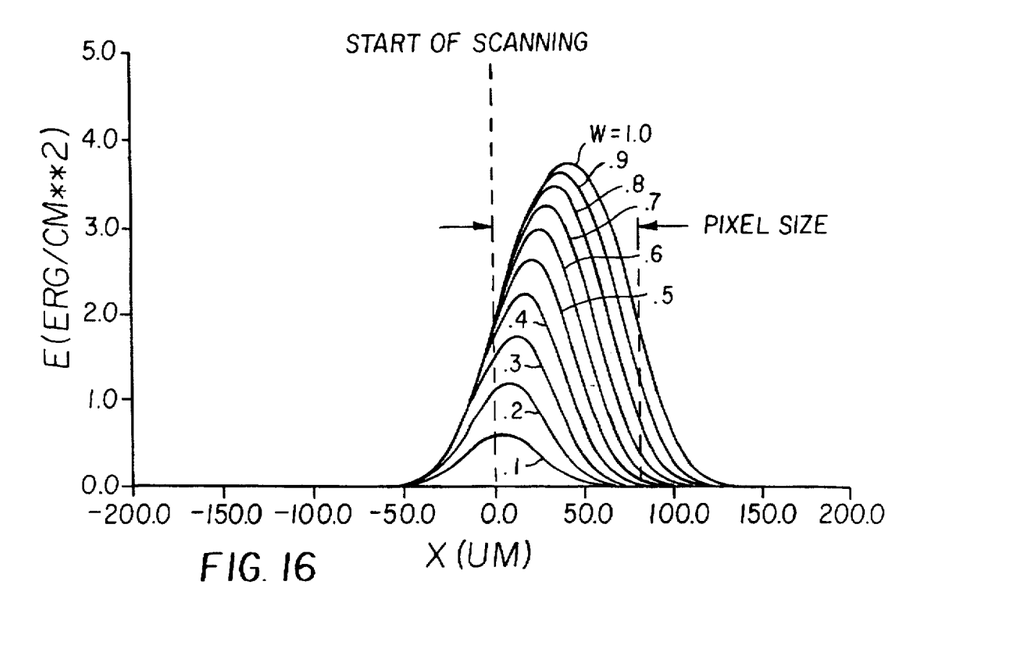
FIG. 16 is a graphical view of the exposure profile of a single pixel at constant laser power with various pulse widths.

When pulse width modulation is used, the exposure profile of a single pixel at constant laser power with various pulse widths is typically shown in FIG. 16. Depending on the laser spot size relative to the pixel size, the resulting density profile of the image may comprise of nonoverlapping or overlapping dots. Each dot has a nonuniform transmission profile. In other words, the image may look like a pseudo-halftone image as compared to a continuous tone image produced by amplitude modulation. Therefore, to obtain a linear relationship between output image density and input image code value, the image signal must be compensated with a precalibrated compensation lookup table As shown in FIG. 14, the lookup table 32 provides the proper digital signals for modulating the laser power for both amplitude and pulse-width modulation schemes. Thus, the compensation of non-ideal transfer function of the pulse width modulator is handled by LUT 32' in FIG. 15 which shows a modification of the circuit of FIG. 14.

LUT 50 provides compensation for reciprocity law failure effect and for pseudo-halftone image.

The invention has been described with reference to specific embodiments thereof, but it will be understood that variations and modifications thereto are within the spirit and scope of the present invention.

What is claimed is:

1. A laser imaging apparatus comprising:

a source of a digital medical image having first lower and second upper contiguous ranges of digital image code values;

a laser diode for producing a laser light to expose photosensitive material to reproduce said digital medical image;

an amplitude modulator for modulating said laser diode to produce an amplitude modulated laser light over said second range of code values;

a high speed pulse width modulator for modulating said laser diode to produce a pulse width modulated laser light over said first range of code values, wherein the exposure of said photosensitive media at the lower and upper ends of said first range of digital image code values is normally nonlinear; and means for compensating for said normally nonlinear upper and lower ends of said first range of digital image code values by adjusting said diode laser light output so that the resulting exposure of said photosensitive media varies linearly with the first range of digital image code values.

2. The apparatus of claim 1 wherein said means for compensating includes a digital lookup table generated by a calibration step which involves exposing a calibration photosensitive media with a gray scale pattern and measurement of the densities of the exposed gray scale pattern with a densitometer.

3. The apparatus of claim 1 wherein said high speed pulse width modulator operates at a clock rate at or near 50 Mhz.

4. The apparatus of claim 1 wherein said pulse width modulator is programmable to place the laser light pulse at random positions within the pixel period to minimize line-structure artifacts.

* * * * *